United States Patent [19]

Spiegelberg

[11] 4,214,144
[45] Jul. 22, 1980

[54] STUD WELDING APPARATUS AND PROCESS

[75] Inventor: Gary R. Spiegelberg, Lagrange, Ohio

[73] Assignee: Erico Products, Inc., Cleveland, Ohio

[21] Appl. No.: 887,051

[22] Filed: Mar. 16, 1978

[51] Int. Cl.² .......................... B23K 9/20; B23K 9/28
[52] U.S. Cl. .................................... 219/99; 219/138; 269/8
[58] Field of Search .................. 219/98, 99, 158, 138, 219/144, 86.32, 93, 94, 106; 85/35, 32 WE; 269/8

[56] References Cited

U.S. PATENT DOCUMENTS

| | | | |
|---|---|---|---|
| 372,957 | 11/1887 | Bradley | 85/35 |
| 710,257 | 9/1902 | De Leeuw | 269/8 |
| 1,509,528 | 9/1924 | Richards | 85/35 |
| 1,632,991 | 6/1927 | Booth | 85/35 |
| 1,829,972 | 11/1931 | Wiley | 85/35 |
| 2,312,083 | 2/1943 | Doane | 219/158 |
| 2,477,430 | 7/1949 | Swanstrom | 219/93 X |
| 2,477,765 | 8/1949 | Nelson | 219/98 |
| 2,623,974 | 12/1952 | Prucha | 219/98 |
| 2,931,888 | 4/1960 | Thome | 219/105 X |
| 2,942,339 | 6/1960 | Lyon | 219/93 X |
| 4,045,649 | 8/1977 | Moss et al. | 219/144 X |

FOREIGN PATENT DOCUMENTS

739405  10/1955  United Kingdom ........................ 85/35

OTHER PUBLICATIONS

Western Electric Technical Digest, No. 23, Jul., 1971, Magnetic Holding of Nonmagnetic Article; Beltz & Fegley.

*Primary Examiner*—B. A. Reynolds
*Assistant Examiner*—Keith E. George
*Attorney, Agent, or Firm*—Maky, Renner, Otto & Boisselle

[57] ABSTRACT

A part of hard, weldable material which has been through drilled and tapped is sealed by stud welding a stud thereover to form a fluid-tight article which is used to facilitate the connecting of other parts. The threads are protected during stud welding by a conductive refractory insert in the tapped through bore thereby preventing molten metal or the like from entering the same. A magnetic jig serves to hold the insert and as an electrical connector of the insert to the part to permit the proper arc to be drawn during stud welding.

17 Claims, 5 Drawing Figures

U.S. Patent  Jul. 22, 1980  4,214,144
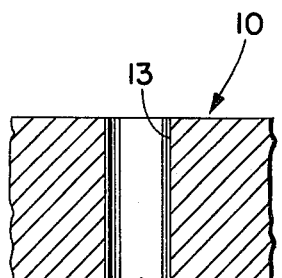
_Fig. 1_
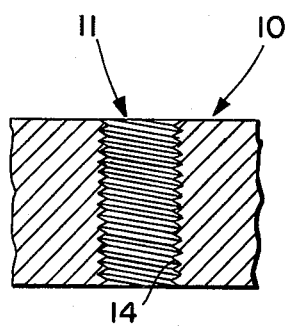
_Fig. 2_
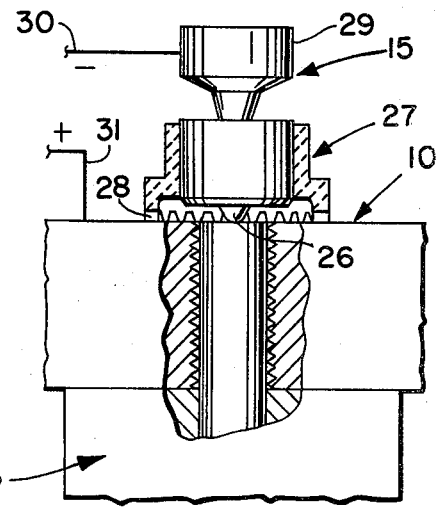
_Fig. 4_
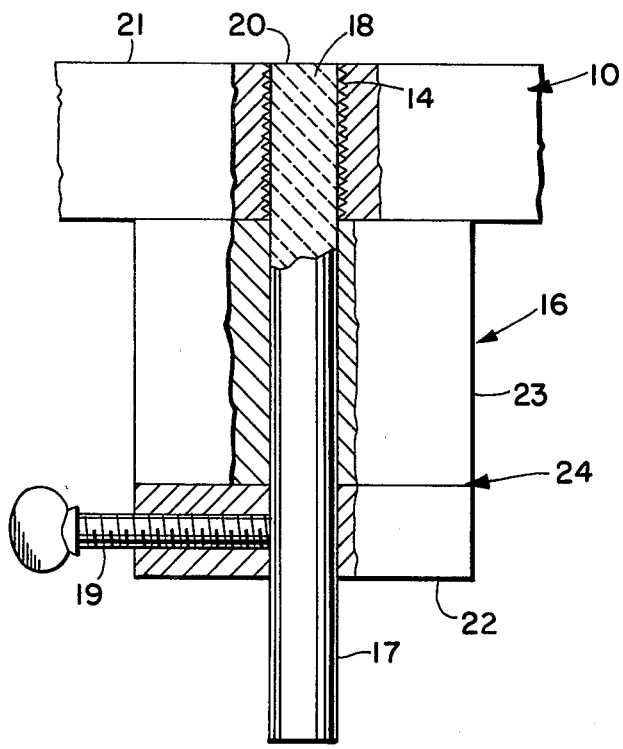
_Fig. 3_
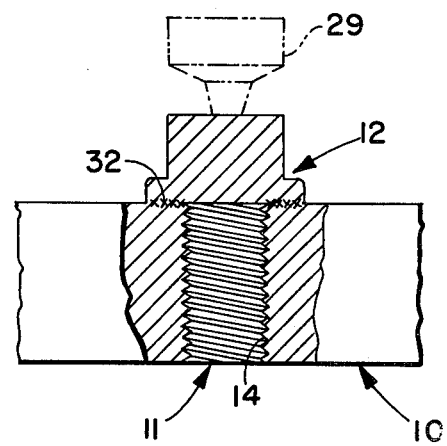
_Fig. 5_

STUD WELDING APPARATUS AND PROCESS

BACKGROUND OF THE INVENTION

This invention pertains to stud welding and, more particularly, to the use of stud welding to form blind tapped holes having improved depth-thread ratios, all of which may be accomplished with thinner parts and thus less metal. Moreover, this invention relates to a new process to facilitate the joining of plates or the like by the use of blind tapped holes simplifying fabrication techniques while using less material. Preferably, such joining is accomplished by drilling a hole through a part, tapping the hole and closing and sealing one end of the hole by stud welding a stud thereover. A threaded connector inserted into the open end of the hole, then, may be used to secure a second plate or the like to the first.

Conventionally, such plates or other parts are attached or joined by a process which requires the drilling and then tapping of a blind hole in one of the parts. The blind hole is drilled to a depth which is near to the far surface of the part for maximum thread depth. It has been found desirable that the depth of threads for securely fastening such parts or the like should be 1½ times the diameter of the bolt or threaded connector. If this ratio cannot be achieved then a thicker part must be employed. If a thicker part is employed then most of the additional material is wasted. A thicker part can, of course, be welded to the part but this then greatly increases fabrication costs. Thus, the part, when using the conventional method, must be thicker, to accommodate the blind hole, than the part used in applicant's method which is through drilled and tapped.

Therefore, the conventional process requires penetration accuracy drilling which is inherently disadvantageous. Another disadvantage with conventional methods is that as the blind hole is tapped, metal chips and shavings clog the hole or the threads. Consequently, cleaning steps are required including the air blasting or blowing out of the chips or shavings before the connector is inserted. Still another disadvantage is that the blind hole will frequently require finish tapping, or bottom tapping, with a still further cleaning operation following the finish tapping of the blind hole usually being necessary. A tapped through-hole is always easier and more economical to make and does not encounter the problems or potential problems and drilling and tapping blind holes. (Seek the TOOL ENGINEERS HANDBOOK of the ASTE published by McGraw Hill, 1949, page 807)

SUMMARY OF THE INVENTION

In accordance with the present invention, a hole is drilled completely through a plate or other metal object and the through-hole is fully tapped. A stud cap, then, is stud welded to the plate over one end of the hole to close the same while leaving available maximum threads for connecting purposes.

In accordance with one aspect of the invention, a conductive refractory rod or the like is inserted into the drilled and tapped hole to provide both an electrode function for the stud welding operation and a protective function to keep the threads of the hole clean during stud welding. Preferably the rod is held by a magnetic jig secured to the plate and through which current may flow to the rod during stud welding.

A prime object of this invention is to facilitate the joining of plates or like metal objects with simplified techniques and less material, particularly where the item fabricated may contain fluids such as tanks or transmission housings, for example.

Another principal object is the provision of apparatus for closing the ends of holes in plates and like objects with stud welding techniques.

Accordingly, the invention comprehends a plate or other metal object with a drilled and tapped through-hole which has a stud stud welded at one end of the hole.

This invention further relates to the use of a refractory electrically conductive graphite or carbon rod or insert for the dual purpose of providing an electrode function required in stud welding and of protecting the through-hole during stud welding to prevent molten metal flow into the same. In accordance with a related aspect of the invention the adjustment and placement of the rod or insert is facilitated by use of a magnetic jig.

A further principal object is to provide a process or method for joining plural plates or like metal objects while obtaining maximum thread depth for optimum strength with a minimum of fabricating steps and material.

A further important object is the provision of apparatus and a process for economically forming blind tapped holes.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWING

In the annexed drawing:

FIG. 1 is a fragmentary section of a metal plate with a throughhole drilled therein;

FIG. 2 is a similar section showing the same plate with the through-hole tapped;

FIG. 3 is a side elevation partially broken away and in section of the plate with a magnetic jig secured thereto holding a conductive refractory rod in the hole;

FIG. 4 is a fragmentary view similar to FIG. 3 showing a stud in place preparatory to stud welding; and FIG. 5 is a view similar to FIGS. 1 and 2 of the finished plate with the stud welded over the end of the hole.

DESCRIPTION OF THE PREFERRED EMBODIMENTS

Referring in detail to the drawing, there is illustrated in FIG. 1 and 2 a metal plate 10 which may be a wall of a housing or tank, for example, made of a hard, weldable material, such as steel. The plate may, of course, be a casting or any metal component of an assembly to be fabricated. The housing may contain a fluid such as oil, as in a tank or gear box and consequently, maintaining the fluid-tight integrity of the housing is essential.

For example, interior access may be achieved by cutting an opening or window in the housing wall. Several drilled and tapped through-bores or holes, similar to the one shown at 11 in FIGS. 1 and 2 are located around the window and the bores are capped as at 12 in FIG. 5 to provide a fluid-tight cap at each. A sealed cover plate, not shown, may then be secured over the window utilizing the threaded capped holes into which appropriate fasteners, such as bolts are secured. The capped holes, then, facilitate the securing function of a readily removable cover of an access part to, for example, an oil filled steel housing while helping to maintain the fluid-tight integrity of the latter.

The plate 10 is FIGS. 1 and 2 has the hole 11 drilled completely through the plate, thereby eliminating the need for penetration accuracy required for drilling a blind hole. The through-hole 11 is tapped, preferably in one step to form in the previously smooth wall 13 (FIG. 1) continuous threads 14 (FIG. 2) to which a bolt or other connecting mechanism, not shown, may be attached. The tapping of the entire through-hole 11 is, of course, a much simpler operation than drilling and tapping a blind hole. Moreover, to provide the same extent of threads in a blind hole would require a plate of substantially greater thickness.

The method of capping or closing the hole 11 to convert it to a blind hole is depicted in FIGS. 3 and 4. The cap is produced by stud welding a stud 15 over the hole 11, which preferably already has been tapped with threads 14. In this respect, a magnetic jig 16 (FIG. 3) attached to one surface of plate 10 provides a dual function: first, the magnetic jig holds a conductive refractory rod 17 in place with an end 18 in the through-hole 11 to keep the same clean and free of molten metal; and second, the magnetic jig provides an electrical connection to the rod from the plate and thus to the stud welding power source. The rod 17 is held in the jig 16 by a clamp screw 19 that allows adjustment of the rod axially to position its end surface 20 flush or substantially flush with the other surface 21 of the plate 10. Preferably the clamp screw 19 is accommodated in a metal plate 22. Utilizing the plate 22 facilitates the assembly of magnetic jig 16. The plate 22 is preferably secured to the permanent magnet 23 of the jig by a highly conductive silver solder or braze indicated at 24 so that the good electrical conductivity is obtained between the plate 10 and rod insert 17 through the magnet 23 and plate 22. Both the magnet and plate are provided with the aligned holes shown to accommodate rod inserts of various diameters, which diameters should be close to but slightly less than the crest or minor diameter of threads 14. A separate plate is employed because the material of the magnet 23 is generally too hard to permit it readily to be drilled and tapped to accommodate screw 19.

The stud welding stud 15 is positioned over the drilled and tapped hole which is plugged by the rod end 18. The stud is somewhat larger than the hole and is electrically connected to the stud welding power source, as shown. Specifically, the stud is situated directly over the rod 17 and tapped hole 14 with the projecting flux ball or cone 26 resting upon the rod end face. A ceramic disposable ferrule or shield 27 surrounds the stud 15 and acts as a container or mold for the weld and rests upon the plate 10. The ceramic ferrule 27 has serrated edges 28 or the like, which vent the weld area in conventional fashion.

The stud 15 is provided with a knock-off extension 29 which effectively extends the axial length of the stud to permit the same to be gripped by the chuck of the stud welding gun. The negative lead 30 of a stud welding power source, not shown, is connected to the stud 15 and the plate 10 is connected to the positive lead 31, all in conventional manner with stud welding equipment.

The initial arc is drawn between the projecting flux 26 and the rod 17 by lifting the stud 15, the ceramic ferrule 27 contains the arc which scavenges the plate 10 resulting in the melting of the stud and plate. When the control times out the gun plunges the stud into the molten metal formed by the arc. Without the conductive rod insert, the proper arc could not be drawn.

FIG. 5 illustrates the plate 10 after the stud welding has occurred. The magnetic jig, ferrule and stud remnant 29, shown in phantom, have been removed. The weld 32 has sealed the tapped hole so as to produce a fluid-tight cap without affecting the threads.

Studs and stud welding equipment such as controls, power supplies and guns which may be used with the present invention may be of the type sold by Erico Products, Inc. of Solon, Ohio under the trademark BLUE ARC ®.

The resulting part is produced by a method whereby the plate 10 of hard weldable material or the like, is through drilled and tapped. The through tapped hole is closed or converted to a blind or sealed hole by stud welding a stud over the tapped bore. This is accomplished by inserting a conductive rod into the tapped hole, which rod is held in place with a conductive magnetic jig assembly.

To protect the threads, the rod 17 must be refractory and to permit the stud welding to be completed properly it must be conductive, as well as properly electrically connected to the part. Graphite or carbon rods have been found suitable for the noted purpose. A stud is placed over the tapped hole and stud welded onto the plate.

The result is a simplified fabrication technique for a wide variety of fabrications which quickly converts a through tapped hole into a blind hole with the use of a minimum amount of material.

The embodiments of the invention in which an exclusive property or privilege is claimed are defined as follows:

1. Apparatus for facilitating the drawn arc stud welding closure of hole ends in metal objects, comprising a stud larger than and for stud welding over a hole end in a metal object, an electrically conductive refractory insert for drawing a welding arc removably secured within said hole with an end of the insert approximately flush with said hole end, a flux projection secured to the end of a stud to be stud welded against the metal object, and connecting means for electrically connecting the insert to the metal object, whereby stud welding equipment may be electrically connected to the insert and stud for drawing a welding arc between them and effecting the stud welding closure.

2. Apparatus as set forth in claim 1 wherein said connecting means include securing means for removably securing said insert within said hole and approximately flush with the end of the hole.

3. Apparatus as set forth in claim 2 wherein said connecting means comprise a jig with magnetic mounting means, which jig is operative from a magnetically attached position on the side of said metal object opposite said stud.

4. Apparatus as set forth in claim 3 wherein said jig includes clamp means for making said insert immovable.

5. Apparatus as set forth in claim 4 wherein said clamp means includes means for providing electrical connection between the jig and insert.

6. Apparatus as set forth in claim 5 wherein said magnetic mounting means comprise a permanent magnet, and wherein said jig has a passageway therethrough for accomodating the insert.

7. Apparatus as set forth in claim 6 wherein said insert is in the form of a graphite rod penetrating said passageway.

8. A jig for use in the drawn arc stud welding closure of the ends of holes in metal objects comprising means for removably securing within a hole in a metal object an electrode means for drawing a welding arc with an end of the electrode means approximately flush with said hole end, conductive means for electrically connecting the electrode means with said metal object, and mounting means for securing the jig to the metal object, said electrode means comprising an electrically conductive refractory insert.

9. A jig as set forth in claim 8 wherein said mounting means comprise an electrically conductive permanent magnet.

10. A jig as set forth in claim 9 wherein said magnet has electrically conductively secured to one end an electrically conductive plate means, with a passageway through said plate means and magnet for accomodating said electrode means, and wherein the plate means include clamp means for adjustably engaging the electrode means and for providing good electrical connection between the plate and electrode means, said conductive means comprising said magnet, plate means and clamp means.

11. A jig as set forth in claim 10 wherein said magnet is comprised for metal and said plate means comprise a softer more easily drilled and tapped metal than the metal of which the magnet is comprised.

12. A jig as set forth in claim 11 wherein said clamp means comprise a threaded shaft and clamp screw.

13. A method of closing hole ends in metal objects comprising the steps of:
removably securing within a hole in a metal object a refractory electrode means for drawing a welding arc with an end of the electrode means approximately flush with said hole end, connecting stud welding apparatus to the electrode means and a stud, and stud welding the stud to the metal object during which a welding arc is struck between the stud and electrode means.

14. A method as set forth in claim 13 wherein the welding arc is initially struck between said electrode means and a flux projection secured to the stud end to be welded.

15. A method as set forth in claim 14 wherein a good electrical connection is provided said electrode means and said metal object.

16. A method as set forth in claim 15 including the step of electrically connecting a stud welding power supply to said electrode means by connecting the power supply to said metal object.

17. A method as set forth in claim 16 wherein said good electrical connection between the electrode means and said metal object is provided by means of a magnetic jig.

* * * * *